United States Patent [19]

Jones

[11] Patent Number: 4,529,464
[45] Date of Patent: Jul. 16, 1985

[54] PROCESS FOR MANUFACTURING A FOOD CONTAINER BY EXTRUSION AND VACUUM FORMING

[75] Inventor: Michael D. Jones, White Bear Lake, Minn.

[73] Assignee: Champion International Corporation, Stamford, Conn.

[21] Appl. No.: 312,664

[22] Filed: Oct. 19, 1981

Related U.S. Application Data

[60] Continuation of Ser. No. 156,819, Jun. 5, 1980, abandoned, which is a division of Ser. No. 927,173, Jul. 21, 1978, abandoned.

[51] Int. Cl.$^3$ .......................... B29C 17/04; B32B 1/02; B32B 1/04
[52] U.S. Cl. .......................... 156/244.24; 156/244.11; 156/244.27; 156/272.6; 156/285
[58] Field of Search ...................... 156/285, 245, 272.6, 156/244.11, 244.22, 244.23, 244.24, 244.27

[56] References Cited

U.S. PATENT DOCUMENTS

| | | | |
|---|---|---|---|
| 3,657,044 | 4/1972 | Singer | 156/285 |
| 3,697,369 | 10/1972 | Amberg et al. | 156/285 |
| 3,823,061 | 7/1974 | Frayer et al. | 156/272 |
| 3,924,013 | 12/1975 | Kane | 156/244.23 |
| 4,337,116 | 6/1982 | Foster et al. | 156/285 |

*Primary Examiner*—Jerome Massie
*Attorney, Agent, or Firm*—Evelyn M. Sommer; John M. Mulholland; William W. Jones

[57] ABSTRACT

Disclosed is a container especially adapted for use in storing and heating comestibles intended for final preparation in microwave ovens. The container comprises a molded pulp tray, having a plastic film, preferably a polyester, adhered to its product-contacting surfaces. The container exhibits high strength and excellent product protection, but yet is low in cost. The process for making the container takes advantage of the porous nature of the pulp tray by drawing a vacuum directly through the tray to draw a film of heated plastic into adhering contact. The film is preferably extruded as the tray, carried in a vacuum mold, passes directly under the extruder.

1 Claim, 4 Drawing Figures

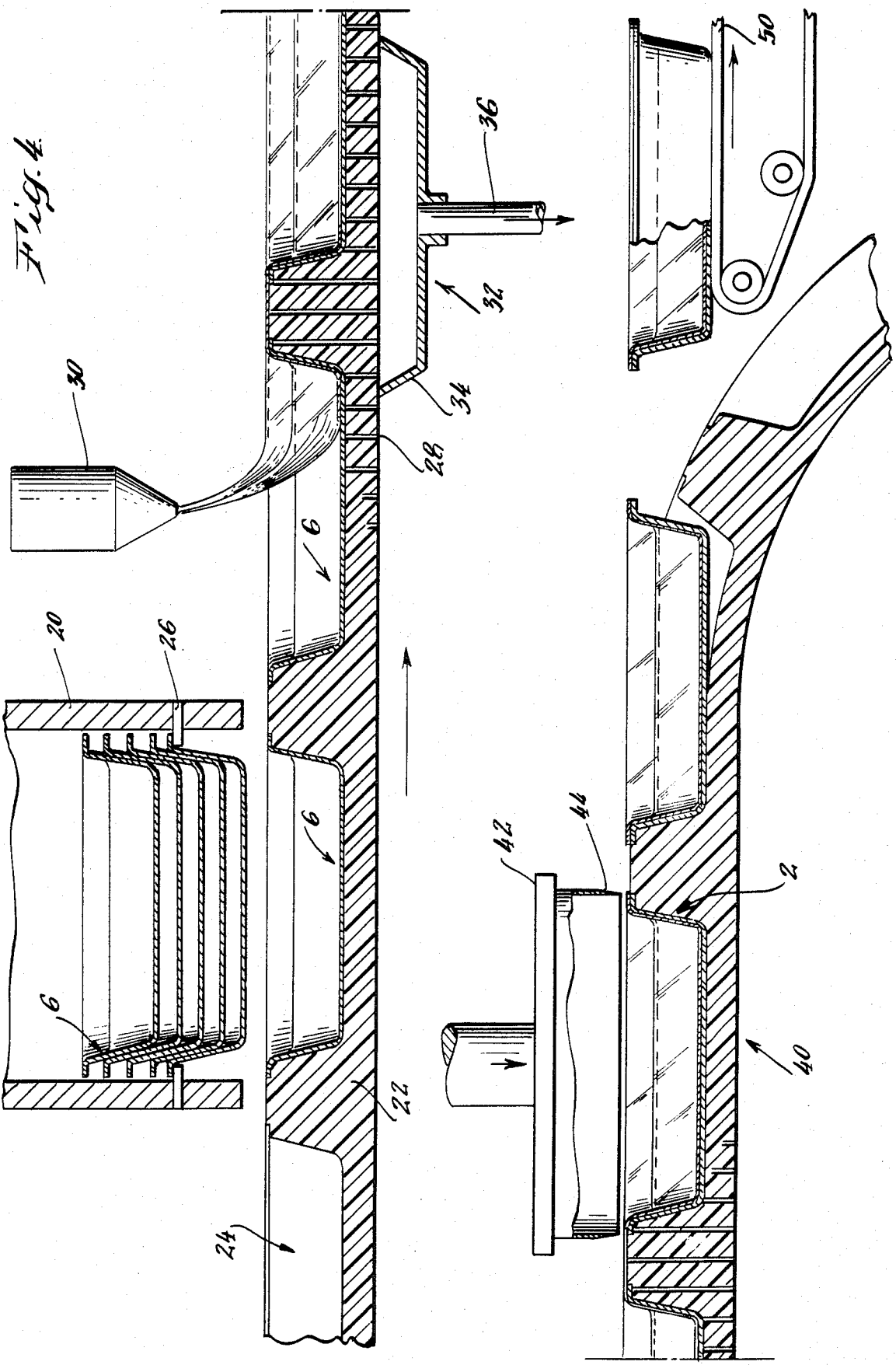

PROCESS FOR MANUFACTURING A FOOD CONTAINER BY EXTRUSION AND VACUUM FORMING

This is a continuation of application Ser. No. 156,819, filed June 5, 1980, now abandoned, which is a division of application Ser. No. 927,173, filed July 21, 1978, now abandoned.

BACKGROUND OF THE INVENTION

1. Field of the Invention

This invention relates to containers and processes for making them, and more particularly to the provision of low cost containers for use in storing and heating comestibles intended for final preparation in microwave ovens.

2. Description of the Prior Art

Microwave ovens have been a boon for quick preparation of comestibles in homes, institutions and automats. The recent increased popularity of these ovens has created a large market for economical containers which, because of the plurality of functions which must be performed and variety of environments which may be encountered, must be capable of withstanding a unique combination of stresses.

The microwave oven permits extremely rapid heating, but by its very nature presents problems. Variability of optimum cooking times for different recipes is encountered where the applied microwave energy heats different materials at different rates depending upon their composition and geometry. Moreover, while one of the advantages of microwave cooking is that the same container can, in theory, be used for both storage and heating, the advantage is lost where the price of the container becomes excessive. The container must be strong at virtually all temperature conditions from below freezing to above boiling. The container must also have a moisture barrier effective at all temperatures yet be in compliance with all regulatory requirements.

Existing containers which have been suggested for use with microwave oven food preparation, have various disadvantages Existing trays made from plastic coated paperboard provide difficulties because they do not present a continuous interior surface when made as a folded carton and create difficulties in shaping a smooth flat flange for adhering a lid when stamped from a flat sheet as in the manufacture of aluminum trays. Where less expensive materials such as molded pulp are considered, these materials do not have a continuous barrier which is necessary for holding certain products such as those containing aqueous and fatty materials. The barrier is also important from the standpoint of preventing bacterial contamination of the food product. Existing containers made from molded plastic materials do not have the desirable combination of low cost and high strength necessary for the wide variety of comestibles and applications for which they would be desired. Aluminum trays, while having the necessary formability, moisture and fat barrier, as well as the desired structural strength required for microwave food product, storage and cooking applications, may present the difficulty that they reflect microwaves prefenting them from getting through to the food contents from the bottom and sides of the tray, resulting in only localized and slow heating of the food from the open top. In addition, in the case of the older models of microwave ovens, if a larger tray containing a relatively small amount of food is used, the excess reflected energy can damage the oven's microwave generation or even cause arcing from the tray to the oven.

Thus, what the art requires is an improved container for use in storing and heating comestibles intended for final preparation in microwave ovens and a simple process for preparing it. The new container should be low in cost and yet have high structural strength, provide a good moisture barrier, and enable ease of formation into the intended final shape. The desired container should also provide for optimal sizing of various compartments in the container to assure optimal cooking times for each material packaged, considering the possibility that a number of different food items might be packaged in the same container but yet require different exposure to the microwave energy. The process must lend itself to the production of containers having these and other attributes. Importantly, to insure low cost, the process must lend itself to continuous operation, and desirably should make changing of container size or shape a simple matter not requiring long down times or expensive adjustment or retooling.

SUMMARY OF THE INVENTION

The present invention provides a container especially adapted for use in storing and heating comestibles intended for final preparation in microwave ovens, and a process for making containers of this type. The container comprises: a tray constructed of one continuous pulp member, having an inside surface defined by an upstanding side wall tapered inwardly from an open top to a smoothly rounded corner which joins the side wall with a bottom wall; and a continuous plastic film adhered to the inside surface. The process comprises providing a pulp tray as described; placing the outer surface of the tray in contact with a support having means associated therewith for drawing the vacuum through the support; placing a film of heated, adherent plastic material into contact with at least the outer periphery of the upstanding wall at the top of the tray; and drawing a vacuum through the support means to pull the film into adherent contact with the inside surface of the tray.

BRIEF DESCRIPTION OF THE DRAWINGS

The invention will be described in detail below with special reference to the drawings wherein:

FIG. 4 is a schematic representation of a preferred process for forming the container of FIG. 1, partially in section.

DETAILED DESCRIPTION OF THE INVENTION

Figure 1:
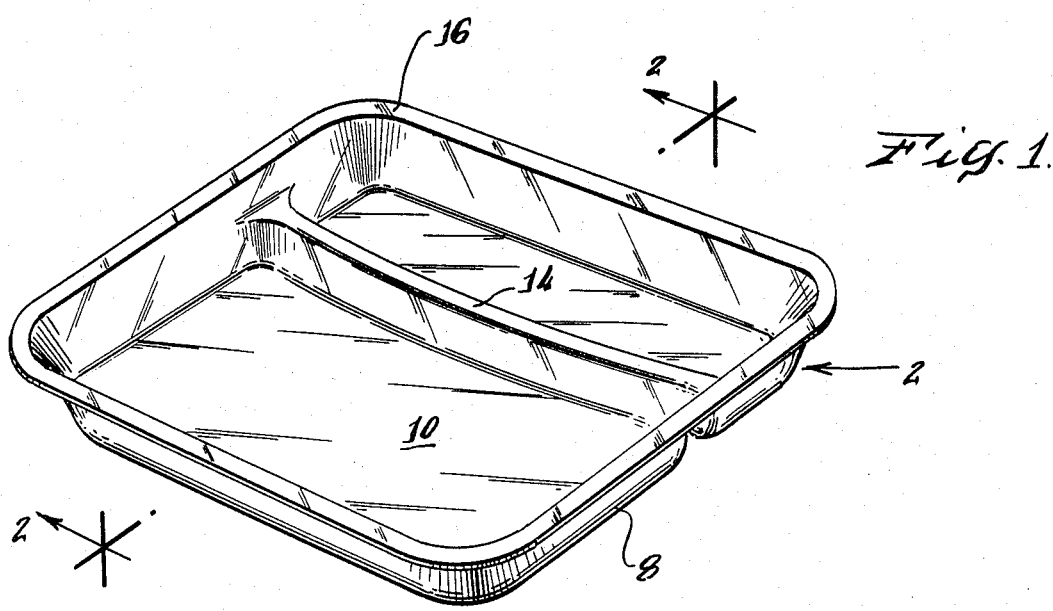
FIG. 1 is a perspective representation of a preferred embodiment of a container according to the invention.
Figure 2:
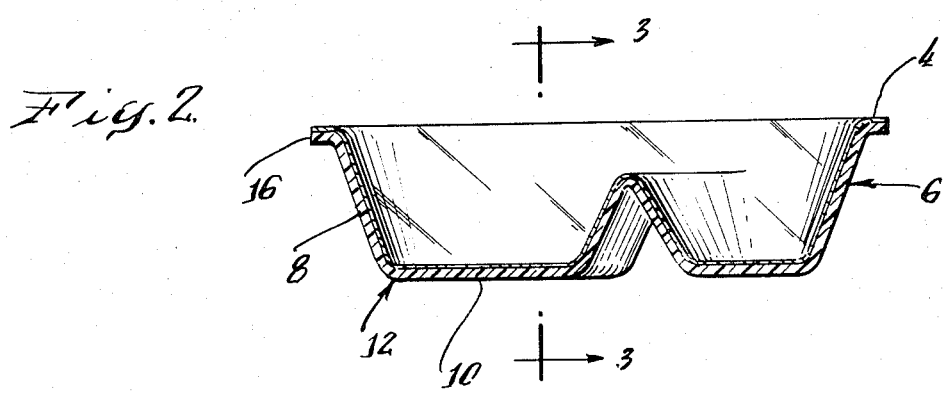
FIG. 2 is a side-elevational view, partially in section, taken along line 2—2 in FIG. 1.
Figure 3:
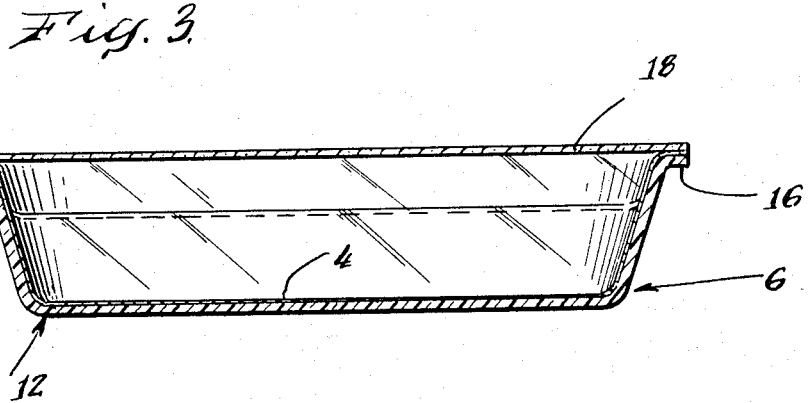
FIG. 3 is a side-elevational view taken in section along line 3—3 in FIG. 2, and showing in addition a cover on the container.

The container of the present invention can take a variety of shapes and be made in a variety of sizes. One preferred embodiment is shown in FIGS. 1 through 3. The container can be formed to have a single compartment wherein the bottom wall of the container is substantially flat, or it can be divided into a number of compartments by forming undulations in the bottom wall to separate various foods. The different compartments will be suitably sized in depth and shape to provide the optimum cooking conditions for the various products.

Referring now specifically to FIG. 1, there is shown a container 2 according to the present invention. The container, as can be seen more clearly in FIGS. 2 and 3, is formed of two different materials. It has an inner surface 4 of a plastic material to provide a continuous vapor, moisture and fat barrier, and it has an outer surface 6 which is a tray constructed of a continuous pulp member to provide structural integrity over a wide range of temperatures. The tray 6, and thus the container, has an upstanding side wall 8 which is joined to the bottom wall 10 by a smoothly rounded corner shown at 12 in the drawing. The side wall tapers inwardly from an open top to the rounded corner. In the particular embodiment shown here, the container is divided into two compartments by rib 14 which is formed as an undulation in the bottom wall.

The tray will also preferably have a flange 16 for attachment of a lid or suitable cover 18, as shown in FIG. 3. The lid or cover can be of any conventional construction which is compatible with the materials and the desired use of the container. For example, it can be of the snap-on variety or it can be a single thickness of plastic film, metal foil or paper, or a suitable laminate of paper or metal foil and film. The lid can be sealed by means of known adhesives or it can be heat sealed directly to the flange where the lid and flange are coated with compatible materials.

The pulp board outer member of tray 6 is prepared in conventional manner by applying a slurry of paper pulp to a mold surface capable of drawing a vacuum through the mold. The slurry containing the paper pulp is drawn to the mold surface and the water is removed therefrom by the vacuum leaving the continuous paper pulp member which is dried as is known in the art. A detailed description of representative formulations and processes can be found in Pulp and Paper, Second Edition, Vol. III, 1961, pg. 1958-9 and Non-Plastic Molded Pulp Product, No. 1964, 1960, U.S. Dept. of Agriculture Forest Service.

The inner plastic layer can be any of the known suitable high polymer organic materials known to the art for use in packaging. Among these are polyethylene, polypropylene, polyesters such as polyethylene terephthalate, vinyl chloride polymers, vinylidene chloride, polymers copolymers of vinyl chloride and vinylidene chloride, and the like. The main requirements for the selection of the particular polymer are that it be compatible with the intended food use of the container and that it be capable of forming an adherent layer on top of the molded pulp tray. The preferred polymers are the polyester resins, with the polyethylene terephthalate resins being most particularly preferred. These materials show good extrusion, food protection, and low toxicity properties.

In practicing the method according to the present invention, the pulp trays 6 are provided preferably in a continuous supply as either individual units supplied to a dispensing device shown as 20 in FIG. 4, or they can be continuously molded in the same vacuum molds employed for drawing the polymer film into the tray to form the containers.

According to a preferred embodiment of the process of this invention, as shown in FIG. 4, a stack of trays 6 is held within dispensing device 20 for supply to a flexible mold member 22. As each individual mold segment 24 passes beneath the dispenser, a tray 6 is dropped within the mold segment by retraction of a holding means 26, such as solenoid plungers, which supports the containers by the container flange. As shown in the drawing, the mold member 22 is preferably continuous, having vacuum ports 28. The molding device 22 carrying the paper pulp tray 6 is passed beneath a continuously operating film-forming device 30 which dispenses an extrudate of molten polymeric material. The extrudate contacts at least the upper surfaces of the upstanding wall of each tray 6 and is drawn into contact with the pulp member by a vacuum as the mold members pass by the vacuum forming station 32. As shown, member 34 causes a vacuum supplied by line 36 to become operatively engaged with ports 28 in the molding surface The applied vacuum is thereby drawn through the molds and through the porous pulp member to cause close and intimate adherence between the plastic film and the molded pulp tray 6.

From the vacuum forming station 32 the polymer-coated tray passes through a trimming station 40 where knife means 42, having trimming blades 44, is indexed with and brought into cutting contact with the excess plastic film which would extend over the edge of the pulp tray member. Alternatively, this trimming operation can be achieved after demolding if desired. After the trimming station 40, the containers are removed from the molding member, which is preferably made of a flexible material, and the trimmed, demolded containers are passed out onto a conveyor 50.

In an alternate procedure to the extrusion of the film by means of film extruder 30, the film can be supplied pre-formed and heated to a temperature proximate its softening temperature by means not shown, prior to application to the pulp board member carried in the mold in the same manner as previously described. Where a preformed film is employed, corona discharge treatment of the surface to be brought into contact with the pulp board member is especially desired to enhance adhesion between the two members. However, the corona discharge is also found to be desirable where the film is formed directly by extrusion.

The following example is presented for the purpose of illustrating the best mode of the present invention and is not to be taken as limiting in any regard.

EXAMPLE

In a preferred embodiment of the present invention a series of containers similar to those shown in the drawing were prepared by placing molded pulp trays in the cavities of a molding device. These molds were passed beneath a plastics extruder operated at a lineal extrusion a speed of 20 meters per minute. The extruder was fed a polymeric composition comprising polyethylene terephthalate which was heated to a temperature of 340° C. and was expressed through a die having an opening 0.61 meters long and 0.51 millimeters in thickness to provide a uniform film which was 0.5 millimeters thick. The film was allowed to drap into contact with the molding device carrying the molded pulp trays and vacuum was applied to the back side of the trays. The vacuum was 100 millimeters of mercury. The vacuum pulled the plastic film into intimate and strongly adherent contact with the paper pulp member. After vacuum forming, the containers were demolded and trimmed.

The above description is for the purpose of teaching those skilled in the art how to practice the present invention. It is not intended to describe each and every detail of the obvious modifications and variations of the invention which will become apparent to those skilled in the art upon reading the description. It is intended, however, that all such obvious modifications and variations be included within the scope of this invention which is defined by the following claims.

What is claimed is:

1. A process for making a container especially adapted for use in storing and heating comestibles intended for final preparation in microwave ovens, consisting of essentially the steps of:

(a) providing a tray constructed of a molded paper pulp member having a continuous inside surface defined by an upstanding sidewall tapered inwardly from an open top to a smoothly rounded corner which joins with a bottom wall, said molded pulp member comprising pulp fiber material defining a multiplicity of interstices in said member to provide said member with sufficient porosity to allow passage of gas therethrough;

(b) placing the outer surface of the tray in contact with a support having means associated therewith for drawing a vacuum through said support;

(c) preparing a film of heated plastic material by forcing a melt through a film-forming die, and maintaining said film in a molten condition until contact with said paper pulp member;

(d) placing said film of heated and molten plastic material into contact with at least the periphery of the upstanding wall at the top of the tray; and (e) drawing a vacuum through said support means and tray to pull the molten film into uniform adherent contact with the entire continuous inside surface of the tray.

* * * * *